United States Patent [19]

Logothetis

[11] 3,956,248

[45] May 11, 1976

[54] ALTERNATING COPOLYMERS OF ETHYLENE/ALKYL ACRYLATES/CURE-SITE MONOMERS AND A PROCESS FOR THEIR PREPARATION

[75] Inventor: Anestis Leonidas Logothetis, Louisville, Ky.

[73] Assignee: E. I. Du Pont de Nemours and Company, Wilmington, Del.

[22] Filed: Aug. 8, 1974

[21] Appl. No.: 495,797

Related U.S. Application Data

[60] Division of Ser. No. 233,741, March 10, 1972, which is a continuation-in-part of Ser. No. 132,177, April 7, 1971, abandoned.

[52] U.S. Cl. .............................. 526/219; 526/227; 526/237; 526/245; 526/292; 526/329
[51] Int. Cl.² ............... C08F 218/00; C08F 220/00; C08F 210/00
[58] Field of Search ............. 260/86.7, 80.81, 85.5, 260/78.5 BB, 80.75, 79.5 C

[56] References Cited

UNITED STATES PATENTS

| | | | |
|---|---|---|---|
| 3,183,217 | 5/1965 | Serniuk et al. | 260/85.5 |
| 3,793,262 | 2/1974 | Logothetis | 260/86.7 |
| 3,814,734 | 6/1974 | Kawasumi et al. | 260/63 R |

*Primary Examiner*—Joseph L. Schofer
*Assistant Examiner*—Herbert J. Lilling

[57] ABSTRACT

An amorphous substantially linear atactic alternating copolymer having a glass transition temperature less than about 0°C., and an inherent viscosity of about 1 to about 6, said copolymer having repeating units of -A-B- wherein A is a unit of at least one $C_1$-$C_8$ alkyl acrylate and cure-site monomer if the cure-site monomer is an acrylic, and B is independently selected from ethylene and cure-site monomers if the cure-site monomer is an α-olefin. These copolymers are prepared by reacting monomers in the presence of boron trifluoride and a free radical initiator and, when cured, are particularly useful as elastomers.

14 Claims, No Drawings

ALTERNATING COPOLYMERS OF ETHYLENE/ALKYL ACRYLATES/CURE-SITE MONOMERS AND A PROCESS FOR THEIR PREPARATION

This is a division of application Ser. No. 233,741, filed Mar. 10, 1972, which in turn is a continuation-in-part of application Ser. No. 132,177, filed Apr. 7, 1971, now abandoned.

BACKGROUND OF THE INVENTION

This invention relates to copolymers of ethylene, alkyl acrylates, a cure-site monomer, and a process for the preparation of the copolymers. More particularly, this invention is concerned with alternating copolymers of ethylene and alkyl acrylates wherein the alkyl contains 1 to about 8 carbon atoms and selected cure-site monomers, and a process for the preparation for these copolymers.

Polymers of ethylene are well known in the art and have found valuable use as elastomers. However, the known elastomeric ethylene polymers have not proved entirely satisfactory because of their low resistance to hydrocarbon oils and oxidation.

Although it is known that polymers consisting essentially of alkyl acrylate monomer units process good resistance to oils and oxidation, their low temperature properties are unsatisfactory for some applications. Ethylene copolymers containing up to 40 weight % alkyl acrylate units are also known. However, such copolymers generally do not provide substantial improvement in oil resistance over ethylene/α-olefin copolymers.

Thus, there hs been a need for an ethylene polymer having improved low temperature properties, resistance to oils and oxidation, and which can be readily cured to form a vulcanizate.

SUMMARY OF THE INVENTION

This invention provides an amorphous substantially linear atactic alternating copolymer having a glass transition temperature less than about 0°C. and an inherent viscosity of about 1–6 (measured on a 0.1 weight % solution in chloroform at 30°C.), said copolymer having repeating units of:

-A-B- wherein A is independently selected from at least one alkyl acrylate, said alkyl having 1–8 carbon atoms; and B is independently selected from ethylene and an α-olefinic cure-site monomer, said cure-site monomers having the formula

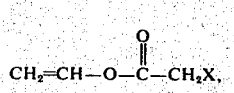

where X is Cl, Br, or F; and further, the mole percent ethylene plus cure-site monomer in the copolymer is about 50, the balance being alkyl acrylate.

This invention also provides a process for preparing an amorphous substantially linear atactic alternating copolymer having a glass transition temperature less than about 0°C. and an inherent viscosity of about 1 to about 6 (measured on a 0.1 weight % solution in chloroform at 30°C.), said copolymer consisting essentially of units derived from at least one alkyl acrylate, said alkyl having 1–8, preferably at least 2, carbon atoms, ethylene units, and about 1–10 mole % based on the copolymer of units derived from a cure-site monomer, the process consisting essentially of reacting in solution in an inert solvent about 1 to about 20 mole % of the alkyl acrylate based on moles of solvent, with ethylene and an effective amount of a cure-site monomer, at a temperature of about −10°C. to about 200°C., preferably 0°C. to about 100°C., in the presence of boron trifluoride at pressures at least sufficient to keep said alkyl acrylate complexed with boron trifluoride and about 0.05 to about 5.0 parts for every 100 parts by weight of alkyl acrylate of a free-radical polymerization initiator, and isolating copolymer formed in the resulting reaction mass.

It has been found that the alternating copolymers of this invention when cured have outstanding resistance to oils. The copolymers of this invention when cured also demonstrate excellent resistance to thermal and oxidative degradation, and are particularly useful as elastomers.

DESCRIPTION OF THE INVENTION

A definition of an elastomer which is applicable to the materials described herein is that of ASTM Special Technical Publication No. 184. An elastomer is "a substance that can be stretched at room temperature to at least twice its original length and, having been stretched and stress removed, returns with force to approximately its original length in a short time." It will be understood that the copolymers are useful as elastomers after the copolymers are cured.

As used herein, the term "consisting essentially of" has its generally accepted meaning as requiring that specified components be present, but not excluding unspecified components which do not materially detract from the basic and novel characteristics of the composition or process as disclosed.

The copolymers of this invention consist essentially of ethylene and units derived from an alkyl acrylate wherein the alkyl is a hydrocarbon group having 1 to 8 carbon atoms, preferably 2–8 carbon atoms. Typical of the alkyl acrylates useful in this invention are methyl acrylate, ethyl acrylate, and butyl acrylate. The preferred alkyl acrylates are ethyl acrylate and butyl acrylate. Mixtures of the alkyl acrylates have also been found to be useful. A particularly preferred mixture consists essentially of ethyl acrylate and butyl acrylate.

The novel copolymers of this invention also contain a cure-site monomer through which cross-linking of polymer chains can occur. The preferred cure-site monomers, and the curing method for polymers containing each type are set forth below. Mixtures of cure-site monomers can also be used.

The cure-site monomers are compounds of the formula

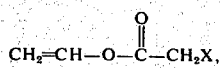

where X is chlorine, fluorine, or bromine. Also compounds of the formula

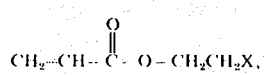

where X is chlorine, fluorine, or bromine. Particularly preferred monomers are vinylchloroacetate and 2-chloroethyl acrylate. Copolymers containing units derived from monomers having either of the above formulas can be cured with aliphatic diamines, such as hexamethylenediamine carbamate.

The novel copolymers of this invention can be cured with the compounds mentioned by the usual techniques. For example, the curing agent and copolymer are mixed on a roll mill or banbury mixer. The resulting mixture is put in a mold, heated at about 150°C. to about 180°C. for about 10 minutes to about 1 hour, and at a pressure generally less than about 2000 psig. The resulting vulcanizate is then cooled and removed from the mold.

A particularly unique aspect of the copolymers of this invention is that the copolymers are alternating copolymers, i.e. there is practically no polymerization among the same types of monomer units. For example, in the copolymers of this invention, there is a practical absence of polyethylene units or polyalkyl acrylate units. There is also a practical absence of interpolymerization among curesite monomer units.

The copolymers of this invention have a glass transition temperature less than about 0°C. This makes the copolymers particularly useful as elastomers. Glass transition temperature for a given copolymer can be determined by methods well known in the art. A typical procedure is described in the Examples. It has been found that the curesite monomer does not appreciably affect the glass transition temperature of substantially linear atactic alternating copolymers of ethylene and alkyl acrylates. For example, in my copending application Ser. No. 132,178, filed Apr. 7, 1971, there is disclosed a novel alternating copolymer of ethylene and ethyl acrylate having a glass transition temperature lower than about −35 °C. The introduction of a cure-site monomer into such a copolymer does not appreciably affect the glass transition temperature. The advantage in achieving this result is apparent. Elastomeric materials generally have glass transition temperatures below 0°C. However, introduction of a cure-site monomer would be expected to raise the glass transition temperature of the copolymer, thereby detracting from the elastomeric properties of the copolymer. In fact, however, the curesite monomer does not appreciably affect the glass transition temperature, but nevertheless permits corss-linking of polymer chains.

The copolymers of the present invention consist essentially of practically all linear chains or "backbones." These copolymers exhibit properties substantially the same as known linear copolymers as evidenced by nmr spectra. Also, the copolymers of this invention have been found to be amorphous and possess practically no stereoregularity.

The copolymers of this invention when used to prepare elastomeric products can be processed with conventional rubber processing equipment in the same way as alphaolefin based elastomers, particularly those elastomers having broad molecular weight distribution. Typical of the rubber processing equipment used are roll mills, and internal mixers (such as Banbury mixers). Mixer loading, operating time and speeds, etc. will be obvious to those skilled in the art.

When the copolymers of this invention are blended with rubbers or other polymers, conventional compounding ingredients, such as carbon black, mineral fillers such as clay, coloring agents, extending oils and the like can be incorporated into the elastomeric composition. Preferably, no ingredients should be added which would reduce the resistance to oxidation, oil or thermal degradation.

There is a particular advantage in blending the copolymers of this invention with other polymers. For example, the copolymers of this invention act as plasticizers when blended with polyvinyl chloride (PVC), thereby improving the low temperature properties of PVC.

Heretofore, there was no known process for preparing the alternating copolymers of this invention. Details of a novel process are described below.

The novel process of this invention consists essentially of reacting ethylene and one or more of the alkyl acrylates and cure-site monomers previously mentioned with a Lewis acid and a free-radical polymerization initiator in an inert solvent.

By inert solvent is meant that the solvent does not react with the reactants or with the product formed. The solvent must also be capable of dissolving the reactants and the copolymer formed. Typical of suitable solvents are dichloromethane, chloroform, dichloroethane, benzene, toluene and chlorobenzene. Dichloromethane and dichloroethane are preferred.

A Lewis acid found to be useful in this invention is boron trifluoride. Equal, less than or more than equal amounts relative to the alkyl acrylate can be used. Less than a stoichiometric amount of the Lewis acid with respect to the alkyl acrylate should be avoided because the rate of polymerization decreases. It is preferred to have an equimolar amount.

When the cure-site monomer is α-olefinic, the sum of the moles of ethylene and cure-site monomer used in the polymerization process should be equal to or greater than the moles of the alkyl acrylate. When the cure-site monomer is an acrylic, the sum of the moles of alkyl acrylate and cure-site monomer should be equal to or less than the moles of ethylene. It is preferred to have a molar excess of ethylene. A 2–10 fold excess of ethylene is particularly preferred. The amount of ethylene present during polymerization is dependent on the pressure. The art skilled will recognize that for a given pressure, there is a maximum amount of ethylene which can be present in the polymerization process.

The amount of the alkyl acrylate present during the polymerization reaction is about 1 to about 20 mole percent based on moles of the solvent, preferably about 10 to about 15 mole percent.

An effective amount of the cure-site monomer is present during polymerization. By "an effective amount" is meant an amount which will yield a copolymer having about 1 to about 10 mole percent of cure-site monomer units based on the total number of monomer units in the copolymer. The art skilled will recognize that the amount of cure-site monomer present will vary for each type of monomer, and will depend on the reactivity of the cure-site monomer relative to other monomers present. Knowing the relative reactivities of the monomers, one skilled in the art can determine with a minimum of experimentation the amount of cure-site monomer to be used by reference to the Examples provided hereinafter.

The polymerization reaction is also conducted in the pressence of a free-radical polymerization initiator, such as an azo-initiator or an organic peroxide. The most effective free-radical polymerization initiators can be determined by a minimum of experimentation. Preferred initiators are benzoyl peroxide, azobisisobutyronitrile, and 2,2'-azobis(2-methylpropionitrile). The amount of the initiator is about 0.05 to about 5.0 parts for every 100 parts by weight of the alkyl acrylate or mixture of acrylates. The amount of he initiator is preferably about 0.1 to about 1.0 parts by weight. The initiator can be added to the reaction mass at the start of the reaction, or gradually as the reaction progresses. It is conveniently dissolved in the inert solvent before addition to the reactor.

The reaction is conducted at about −10°C. to 200°C., preferably 0°C. to about 100°C., most preferably about 25°C. to about 50°C. The pressure utilized during the reaction is at least sufficient to keep the alkyl acrylate complexed with boron trifluoride. Generally, pressures of from about 10 psig to about 10,000 psig, preferably about 100–1000 psig and, most preferably, 100 to about 500 psig are used. The art skilled will recognize that reaction time is a function of temperature. At higher temperatures, the reaction proceeds at a faster rate. For example, at 25°C. a typical reaction will go to completion in about 60 minutes to about 120 minutes. At about 50°C., the same reaction will take only about 30 to about 60 minutes. Completion of the reaction is evidenced by a drop in reaction pressure as ethylene is consumed during the reaction. The process of this invention can be operated on a batch basis.

The apparatus to be used in practicing the novel process of this invention will be apparent to those skilled in the art and will be selected to withstand the operating temperatures and pressures. It is preferable to mix the reaction mass with agitation in order to obtain a more homogeneous product. For example, mild agitation permits the formation of a copolymer having a more uniform inherent viscosity than a similar copolymer prepared without agitation.

The atmosphere above the liquid reaction mass will be saturated with ethylene vapor. The sequence of addition of the reactants to the reaction vessel is not critical. As a practical matter, in a batch process liquids are generally added first to a reactor, the reactor is then closed, and pressurized in turn with $BF_3$ and ethylene. A continuous process can also be used.

After termination of the reaction, copolymer can be isolated by conventional techniques, e.g. drum drying, or steam stripping. Boron trifluoride is easily removed from the product by drum drying or steam stripping. Another method of isolating the copolymer consists of precipitating the copolymer from the solution using hexane.

The novel process of this invention permits the preparation of copolymers having properties which make them useful as elastomers. Yields of over 95 percent based on the weight of the alkyl acrylate initially in the reaction mass can be obtained by the process of this invention.

This invention is further illustrated by the following specific examples. All parts, proportions, and percentages are by weight unless otherwise indicated.

EXAMPLE 1

A. Preparation of Ethyl Acrylate/Ethylene/Vinyl Chloride Copolymer

A solution of 30 grams (0.3 gram mol) of ethyl acrylate (EA) and 0.15 gram of 2,2'-azobis [2-methyl propionitrile] in 200 milliliters of methylene chloride is saturated with 20.4 grams (0.3 gram-mol) of boron trifluoride and placed in a 400 ml shaker tube. After the tube has been cooled in a bath of brushed solid carbon dioxide and evacuated, it is pressured with 5.0 grams (0.08 gram-mol) of vinyl chloride (VCl) and 50 grams (1.8 gram-mols) of ethylene (E). Copolymerization is then accomplished by shaking the tube at 50°C. for 6 hours. The gases are vented, the product removed from the shaker tube, steam passed through the resulting mixture to remove volatiles, including boron trifluoride and solvent, and the isolated copolymer is dissolved in acetone. The resulting solution is filtered, and the ethyl acrylate/ethylene/vinyl chloride copolymer is precipitated by addition of water, washed twice with methanol in a blender mixer, and dried in a vacuum oven at 80°C. The product obtained is a slightly yellow solid weighing 33 grams. It has an inherent viscosity of 3.10 (measured at 30°C. on a solution of 0.1 gram of tripolymer in 100 milliliters of chloroform) and analyzes for 24.85 wt. % oxygen and 1.8 wt. % chlorine. This analysis indicated the following monomer unit composition:

|     | Wt. % | Mole % |
| --- | --- | --- |
| EA  | 77.7 | 50.3 |
| E   | 20.1 | 46.4 |
| VCl | 3.2 | 3.3 |

The azo catalyst used above is also called 2,2'-azoisobutyronitrile. The copolymer is an alternating polymer -(A-B)- where "A" is ethyl acrylate and "B" is selected from ethylene and vinyl chloride. Ideally, the product should contain 50.0 mol % EA, the balance being E and VCl. The glass transition temperature is less than about −35°C.

B. Curing of Ethyl Acrylate/Ethylene/Vinyl Chloride Copolymer

The copolymer prepared in Part A is compounded on a rubber roll mill in accordance with the following recipe:

|     | Parts by Weight |
| --- | --- |
| EA/E/VCl Copolymer | 100 |
| MT carbon black* | 40 |
| MgO | 3.35 |
| Ca(OH)$_2$ | 6.6 |
| Methyltrioctylammonium chloride | 0.33 |
| Hexamethylenediamine carbamate** | 0.33 |

*ASTM type N-990 or N-991
**Diak No. 1 $H_3N\pm (CH_2)_6$—$NHCO_2$—

The stock obtained is placed in a 2.54 × 12.7-cm. (1 × 5-in.) mold and cured in a press at 160°C. under pressure (30,000 lbs. exerted by the ram) for 30 min. Some of the resulting vulcanizate is tested immediately at room temperature (25°C); the rest is heated at atmospheric pressure in an oven at 150°C. for 24 hrs. and then tested at room temperature. Table I below gives typical data.

TABLE I

| Cured Black Loaded EA/E/VCl Copolymer | No Postcure | Postcured at 150°/24 hrs. |
|---|---|---|
| Tensile Strength (kg/cm$^2$) | 45 | 141 |
| Modulus at 300% Elongation (kg/cm$_2$) | 31 | 105 |
| Extension at Break (%) | 605 | 400 |
| Permanent Set at Break (%) | 18 | 8 |
| Shore A Hardness | 56 | 58 |

EXAMPLE 2

A. Preparation of Ethyl Acrylate/Ethylene/Vinyl Chloroacetate Copolymer

A solution of 20 g. ethylacrylate 2.0 g. of vinyl chloroacetate, 0.0165 gram-mole and 0.15 g. 2,2′-azobis(2-methylpropionitrile) in 200 ml dichloromethane is saturated with BF$_3$ and placed in a 400 ml shaker tube. The general procedure of Example 1, Part A is followed except that the temperature is kept at 25°C. for 6 hours. There is obtained 24.3 g. of copolymer having an inherent viscosity of 1.77 (measured as above) and containing 0.5% Cl (1.7 wt. % vinyl chloroacetate).

B. Curing of Ethyl Acrylate/Ethylene/Vinyl Chloroacetate Copolymer

The copolymer prepared by the procedure above (Part A) is compounded in a rubber mill as follows:

| | Parts by Weight |
|---|---|
| EA/E/VClA | 100 |
| FEF Carbon Black | 50 |
| Agerite D | 1.0 |
| Stearic Acid | 4.0 |
| Lead Phosphite | 5.0 |
| Hexamethylenediamine carbamate | 1.0 |

After this composition is cured in accordance with Part B of Example 1 followed by a 24 hour heat aging at 150°C., it gives the following vulcanizable results at 25°C.

TABLE VIII

| Cured Black Loaded EA/E/VClA Copolymer | |
|---|---|
| Tensile Strength or Break (kg/cm$^2$) | 164 |
| Extension at Break (%) | 255 |
| Compression Set (%) [70 hr/100°C., Method B] | 28 |
| Permanent Set at Break (%) | 3 |
| Shore A Hardness | 61 |

A differential scanning calorimeter (prototype of the commercial Du Pont instrument) is used to measure glass transition temperature. It is a miniature oven containing 2 thermocouples. A tiny aluminum cup (0.25-inch in diameter) is seated on each of these thermocouples. The reference cup is empty, air or nitrogen being the medium. The sample cup contains a minute polymer sample (e.g. 15 mg). Since both sample and reference are at the same temperature when the test starts, the thermocouples generate no signal, i.e., ΔT = 0. The starting temperature should be below the second order transition temperature, preferably 0°C. or below. During the measurement, the cups are heated, the temperature in the oven rising at the rate of 11°C./min. At the transition point, however, heat will be absorbed to effect the change of state from glassy to rubbery polymer; since the polymer temperature will be steady, ΔT will suddenly rise as the reference medium becomes warmer than the polymer. When all the glass has become rubber, the polymer will begin to warm up again, and ΔT will fall off toward zero.

For reliable comparisons of polymer samples, each should have had the same history before testing and the test details should be the same (e.g. rate of heating, sample size, etc.).

Typical useful art is the book *Thermoanalytical Methods of Investigation* by P. D. Garn, Academic Press, N. Y. 1965.

I claim:

1. An amorphous substantially linear atactic alterntating copolymer having a glass transition temperature less than about 0°C. and an inherent viscosity of about 1–6 (measured on a 0.1 wt. % solution in chloroform at 30°C.), said copolymer having repeating units of:

-A-B- wherein A is independently selected from at least one alkyl acrylate, said alkyl group having from 1–8 carbon atoms and B is independently selected from ethylene and an alpha-olefinic cure-site monomer having the formula:

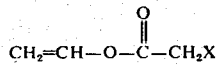

where X is Cl, Br, or F; and further, mole % ethylene plus curesite monomer in the copolymer is about 50, the balance being alkyl acrylate.

2. The copolymer of claim 1 wherein the alkyl group of the alkyl acrylate contains 2–8 carbon atoms.

3. The polymer of claim 1 wherein the alkyl acrylate is ethyl acrylate.

4. The copolymer of claim 1 wherein the alkyl acrylate is butyl acrylate.

5. A process for preparing an amorphous substantially linear atactic alternating copolymer having a glass transition temperature less than about 0°C. and an inherent viscosity of about 1–6 (measured on a 0.1 wt. % solution in chloroform at 30°C.), said copolymer having units derived from at least one alkyl acrylate, said alkyl group having from 1–8 carbon atoms, ethylene units, and about 1–10mole % based on the copolymer of units derived from a curesite monomer, the process consisting essentially of reacting in solution in an inert solvent about 1–20 mole % of the alkyl acrylate based on moles of solvent, with ethylene and an effective amount of a cure-site monomer having the formula:

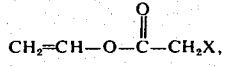

at a temperature of about −10°C. to about 200°C., in the presence of boron trifluoride at pressures sufficient to keep said alkyl acrylate complexed with boron trifluoride, and about 0.5–5.0 parts for every 100 parts by weight of alkyl acrylate of a free-radical polymerization initiator, and isolting the copolymer formed in the resulting reaction mass.

6. The process of claim 5 wherein the alkyl acrylate is ethyl acrylate.

7. The process of claim 5 wherein the alkyl group of the alkyl acrylate contains 2–8 carbon atoms.

8. The process of claim 7 wherein pressure is maintained between about 10–10,000 psig.

9. The process of claim 7 wherein the solvent is dichloromethane, dichloroethane, chloroform, or chlorobenzene.

10. The process of claim 7 wherein the initiator is benzoyl peroxide, azo-bis-isobutyronitrile, or 2,2'-azobis(2-methylpropionitrile) and the initiator is about 0.1 to about 1.0 part for every 100 parts by weight of the alkyl acrylate.

11. The process of claim 7 wherein the $BF_3$ is present in about 0.5 to 1.0 molar equivalent to the alkyl acrylate.

12. The copolymer of claim 1 wherein the cure-site monomer is vinyl chloroacetate.

13. The process of claim 5 wherein the cure-site monomer is vinyl chloroacetate.

14. The copolymer of claim 1 wherein the mole percent cure-site monomer is from about 1–10.

* * * * *